(12) United States Patent
Rupp et al.

(10) Patent No.: US 6,655,230 B1
(45) Date of Patent: Dec. 2, 2003

(54) VEHICLE PEDAL ASSEMBLY

(75) Inventors: Jeffrey Dan Rupp, Ann Arbor, MI (US); Michael Edward Brewer, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 37 days.

(21) Appl. No.: 09/511,516

(22) Filed: Feb. 23, 2000

(51) Int. Cl.⁷ .................................................. G05G 1/14
(52) U.S. Cl. .......................................... 74/512; 74/581
(58) Field of Search .......................... 74/512, 513, 560, 74/584, 581, 582, 583

(56) References Cited

U.S. PATENT DOCUMENTS

| | | | |
|---|---|---|---|
| 3,011,655 A | * 12/1961 | Cannon ...................... 74/584 X |
| 3,945,672 A | 3/1976 | Wong ............................ 293/5 |
| 4,901,426 A | * 2/1990 | Laue ..................... 74/579 R X |
| 4,964,485 A | 10/1990 | Miele ........................ 180/275 |
| 5,249,646 A | 10/1993 | Thiel ......................... 188/71.9 |
| 5,295,709 A | * 3/1994 | Bell ......................... 180/274 X |
| 5,632,184 A | 5/1997 | Callicutt et al. ............. 74/512 |
| 5,778,732 A | 7/1998 | Patzelt et al. ................. 74/512 |
| 5,848,558 A | 12/1998 | Isono et al. ................... 74/512 |
| 5,848,662 A | 12/1998 | Sakaue ....................... 180/274 |
| 5,896,781 A | 4/1999 | Müller ......................... 74/512 |
| 5,916,330 A | 6/1999 | Jacobson ..................... 74/512 |
| 5,921,144 A | 7/1999 | Williams, Jr. et al. ......... 74/512 |
| 6,109,164 A | * 8/2000 | Okuhara et al. ...... 74/579 R X |

FOREIGN PATENT DOCUMENTS

| | | |
|---|---|---|
| DE | 19634257 | 3/1997 |
| EP | 0719697 | 7/1996 |
| WO | WO99/60457 | * 11/1999 |

* cited by examiner

*Primary Examiner*—Chong H. Kim
(74) *Attorney, Agent, or Firm*—Gregory P. Brown

(57) ABSTRACT

A brake pedal assembly 12 for a vehicle includes a pedal 14 and a foot pad 16 operatively engageable by the operator of a vehicle. The pedal assembly 12 also includes a collapsible push rod 22 or 22' connected between the lever 14 and a hydraulic actuator assembly 20. The push rod 22 and 22' includes a first rod member 40 telescopically engaged with a second rod member 42 and collapsible relative one to the other upon experiencing a force greater than a predetermined amount of force. The pedal assembly 12 further includes a connector assembly comprising an inertial mass 50 for preventing collapse of the push rod 22 or 22' during normal vehicle operation, and movable to a second position to allow for collapse of the push rod 22 or 22' upon experiencing a predetermined deceleration. Accordingly, the pedal assembly 12 reduces forces that may otherwise be transferred to the operator of the vehicle during a collision.

20 Claims, 2 Drawing Sheets

VEHICLE PEDAL ASSEMBLY

FIELD OF THE INVENTION

The present invention generally relates to vehicle pedal assemblies and, more particularly, to a pedal assembly, such as a brake pedal assembly, that is releasable from a normal operative condition upon imposition of a frontal load to an automotive vehicle.

BACKGROUND OF THE INVENTION

It is generally known in the automotive vehicle design arts that it is desirable to configure components arranged within the passenger compartment of the vehicle to reduce adverse effects on the vehicle occupants when subjected to high forces that are experienced in a collision. While many vehicle interior components facing the vehicle occupants are designed to minimize the forces during a collision impact, foot pedal assemblies, such as the brake pedal assembly which is generally positioned below the instrument panel of the vehicle in the driver's compartment, may transfer collision caused impact forces to the driver's leg. Likewise, the reaction of the occupant in the collision can force the occupant's legs into the foot pedal controls.

Conventional foot pedal assemblies, such as the brake pedal, clutch pedal, and acceleration pedal assemblies, are commonly assembled together in a pedal box assembly which typically is rigidly connected to the vehicle dash. Foot pedal assemblies employed with hydraulic fluid actuated systems, such as the brake pedal assembly, generally have a foot pedal pad connected to a pedal lever which in turn is assembled to a booster push rod. Axial actuation of the piston push rod, with assist from the vacuum booster, compresses a master cylinder which in turn generates hydraulic fluid pressure. During a crash, vehicle impact forces may be instantly transmitted through the brake actuation system to the occupant.

One approach to minimizing such forces during a severe frontal collision includes structurally connecting the pedal box assembly to a cowl structure which remains relatively stable relative to the dash panel. With the pedal box assembly structurally connected to the cowl structure, relative movement can be made to cause a failure in the structure supporting the pivots of the pedal box assembly, thus allowing the pedals to move freely with little constraint following a severe frontal collision. Other approaches have included the use of mechanical connections, such as a cable, between the cowl or some other relatively stable structure, and the pedal box. With these approaches, the deflection of the pedal assembly relative to the stable structure during a severe frontal collision is used to actively depress the pedal through the action of the aforementioned mechanical connection. However, the aforementioned approaches significantly increase the cost and complexity of the pedal box assembly and may render the pedal assemblies inoperative following a vehicle collision.

Another approach to reducing collision caused forces is disclosed in German Patent Reference DE 19634257 A1 which provides a brake system employing a telescopic brake pressure rod engaged between a brake booster and a foot pedal assembly. The telescopic brake pressure rod includes first and second pressure rod elements telescopically fit one in the other and movable relative to each other in an energy-consuming manner when the foot lever is loaded with an impact force above a predetermined threshold force. While the aforementioned approach may lessen the force transferred to the foot of a vehicle occupant, it is also conceivable that the brake pressure rod may be collapsed by applying excessive force to the foot pedal without the occurrence of a vehicle collision.

Accordingly, there exists a need, heretofore unfulfilled, for a cost efficient pedal assembly for use in a vehicle, that reduces the intrusion forces imparted to an occupant of the vehicle, and which reduces the forces imparted upon the occupant as the occupant reacts against the pedal assembly during a collision event. More particularly, there is a need to provide for a brake pressure rod that reduces force transferred to the vehicle occupant in a manner that is controlled to occur only in the event of a detected vehicle collision.

SUMMARY OF THE INVENTION

In accordance with the teachings of the present invention, a pedal assembly, such as a brake pedal system, for a vehicle is provided which reduces collision caused impact forces applied to the pedal assembly during a vehicle collision. The pedal assembly includes a pedal operatively engageable by a vehicle operator and a collapsible actuating push rod. Preferably, the brake pressure rod is operatively engaged with an actuator assembly for generating an amount of pressurized fluid. The push rod includes first and second rod members, preferably fit telescopically one inside the other, and are collapsible when impacted with a force above a predetermined threshold force. The pedal assembly further includes a control mechanism that is positioned in one state to prevent collapse of the push rod during normal operating conditions and is movable to another state upon detecting vehicle deceleration indicative of a collision vent to thereby allow the brake pressure rod to deform upon experiencing the predetermined threshold force. Accordingly, the pedal assembly of the present invention advantageously reduces forces transferred to the pedal during a collision.

These and other features, advantages and objects of the present invention will be further understood and appreciated by those skilled in the art by reference to the following specification, claims and appended drawings.

DETAILED DESCRIPTION OF THE PREFERRED EMBODIMENTS

Figure 1:
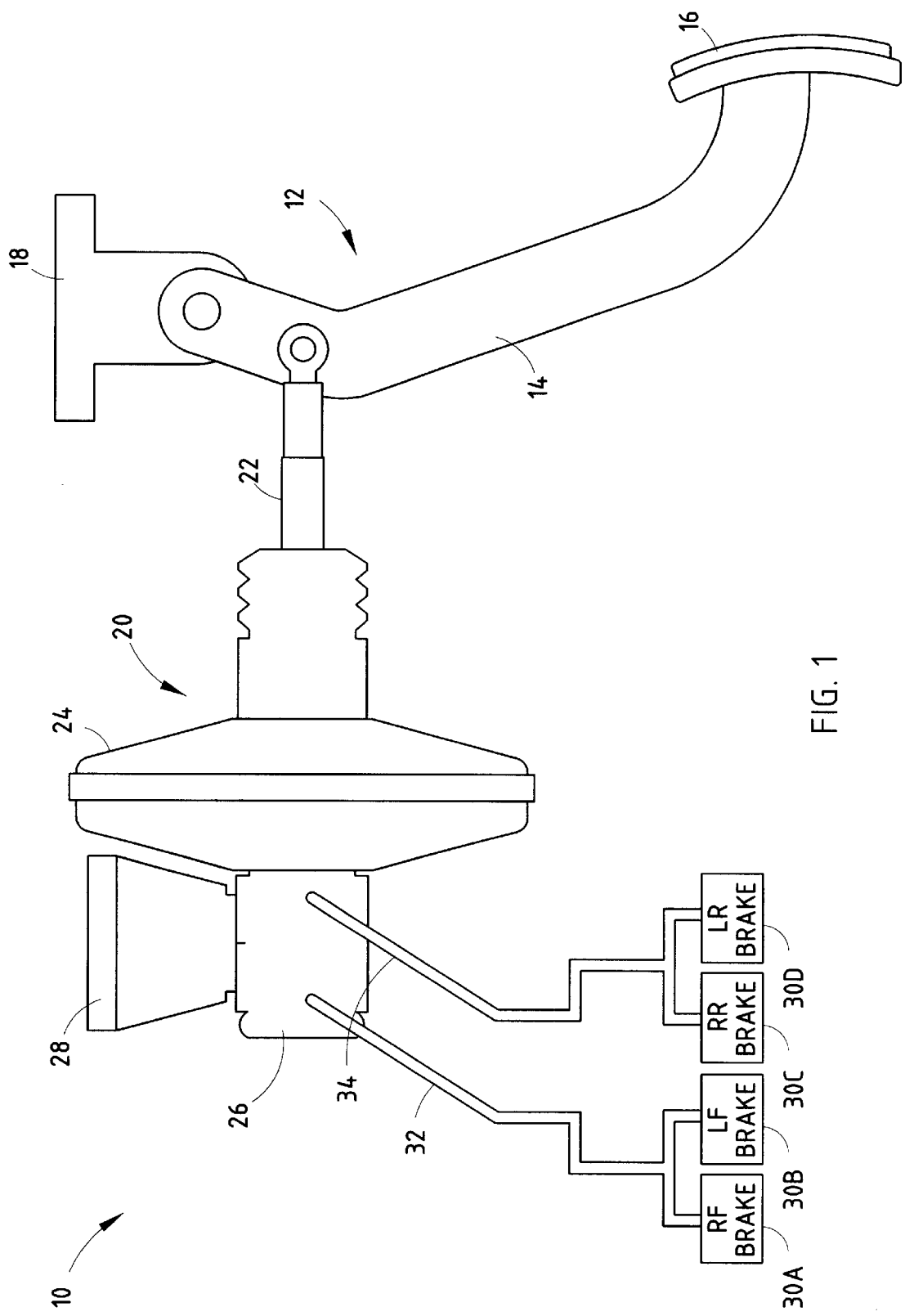
FIG. 1 is a diagrammatic view of a brake pedal system having a brake pedal assembly employing a collapsible brake pressure push rod according to one embodiment of the present invention.

Referring to FIG. 1, a hydraulic brake system 10 is shown according to one embodiment of the present invention for use in braking a vehicle, such as an automobile. The brake system 10 has a brake pedal assembly 12 generally located in the passenger compartment, and generally defined rearward of a dash panel in the vehicle. The brake pedal assembly 12 includes an elongated pedal 14 pivotally mounted at its upper end to a pivotal connection 18 which in turn is generally rigidly secured to the dash panel. Proximate the lower end of the pedal 14 is a pedal pad 16 configured to be operatively engageable with the foot of the vehicle operator, i.e., driver, to pivot the pedal 14 clockwise as shown in FIG. 1 so as to actuate the braking system. The brake pedal assembly 12 further includes a collapsible, i.e., deformable, brake pressure push rod 22 assembled to pedal 14. Collapsible brake pressure push rod 22 is axially movable in cooperation with pedal 14 and operatively engages a brake actuator assembly 20. As described in greater detail below, brake pressure push rod 22 operates as a rigid push rod to actuate braking operation of the vehicle during normal vehicle operating conditions, and is collapsible so as to absorb energy and to reduce the transfer of forces, such as impact forces, to the foot of the operator during a frontal impact collision of the vehicle.

The brake actuator assembly 20 is equipped with a vacuum booster 24, a brake master cylinder 26, and a hydraulic fluid storage reservoir 28. Storage reservoir 28 contains a reserve of non-pressurized hydraulic brake fluid. The vacuum booster 24 provides assist to the brake pressure push rod 22 to actuate the master cylinder 26. The master cylinder 26, in cooperation with the vacuum booster 24, generates a controlled amount of hydraulic fluid pressure in response to axial movement of the brake pressure push rod 22, which in turn is responsive to operator actuation of pedal pad 16, as is generally known in the vehicle brake art. The brake actuator assembly 20 made up of vacuum booster 24, master cylinder 26 and reservoir 28, as well as pedal 14 and pedal pad 16 of the brake pedal assembly 12, may include conventional brake system assemblies.

The vehicle brake system 10 is shown having four brakes including right front brake 30A, left front brake 30B, right rear brake 30C, and left rear brake 30D, according to one example. Brakes 30A–30D provide friction braking to brake the corresponding wheels on the vehicle in response to the hydraulic fluid pressure generated by the actuator assembly 20. Each of brakes 30A–30D may include conventional brake assemblies made up of calipers/cylinders and brake pads as is commonly known in the vehicle brake art.

In addition, primary and secondary brake hydraulic circuits 32 and 34 provide hydraulic brake fluid flow paths between the master cylinder 26 and each of brakes 30A–30D. According to the example shown, hydraulic circuit 32 is coupled to brakes 30A and 30B, while hydraulic circuit 34 is coupled to brakes 30C and 30D. However, it should be appreciated that one or more hydraulic circuits may be employed and may be otherwise connected to one or more vehicle brakes. For example, the brake hydraulic circuits could be diagonally biased, as is commonly known in the vehicle brake art.

Figure 2:
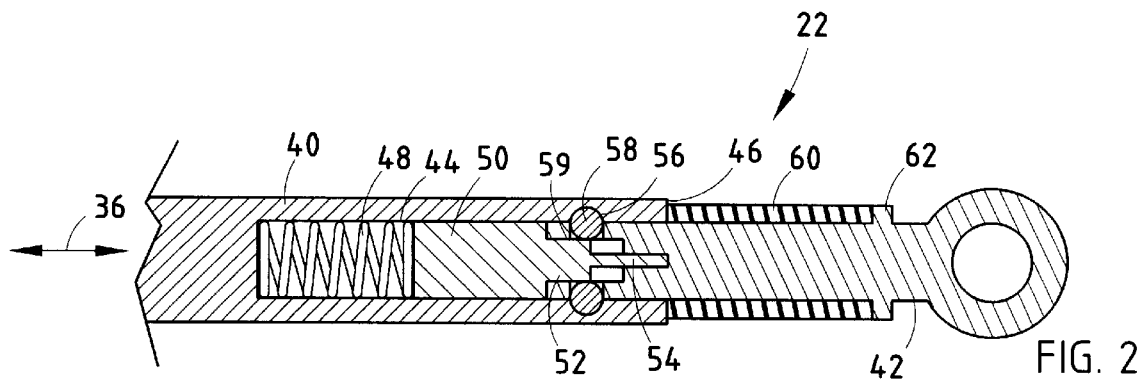
FIG. 2 is a partial enlarged cross-sectional view of the brake pressure push rod of FIG. 1 shown in the non-collapsed position during normal vehicle operation.
Figure 3:
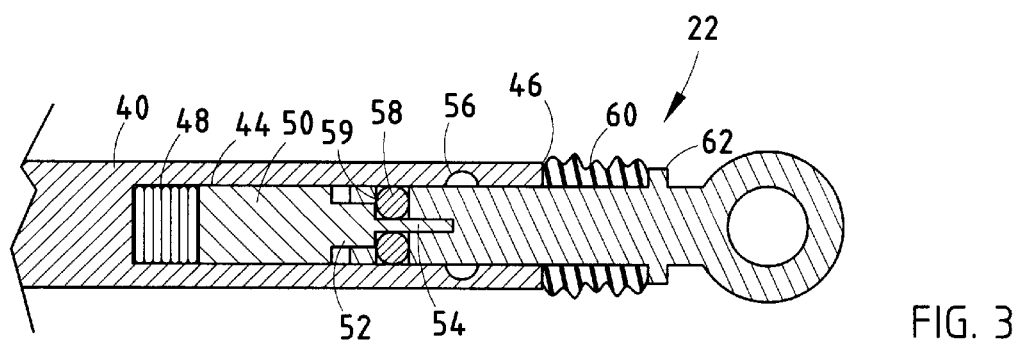
FIG. 3 is a partial enlarged cross-sectional view of the brake pressure push rod of FIG. 1 shown in the collapsed position during a vehicle collision.

According to one embodiment of the present invention, a collapsible brake pressure push rod 22 is employed in the pedal assembly 12 as is more particularly shown in FIGS. 2 and 3. Referring to FIG. 2, the brake pressure push rod 22 is made up of a first rod member 40 telescopically engaged with a second rod member 42. First rod member 40 is operatively engaged at one end with the vacuum booster 24, while the second rod member 42 is assembled to pedal 14. The first rod member 40 is generally cylindrical and has a cylindrical chamber 44 extending therein from the other end 46. Disposed within cylindrical chamber 44 is a connector assembly that serves as a control mechanism to rigidly connect the first and second rod members 40 and 42 during normal vehicle operation. The connector assembly includes a movable inertia mass 50 and a spring 48 disposed between inertial mass 50 and the innermost wall of chamber 44 that biases the inertial mass 50 toward a first position. Inertial mass 50 is preferably cylindrical and substantially conforms to the shape of chamber 44, and is axially movable in response to deceleration of an amount indicative of experiencing a frontal collision of the vehicle. Accordingly, inertial mass 50 is movable along an axis 36 which is preferably substantially aligned with the longitudinal axis of the vehicle. Opposite the spring biased side of inertial mass 50 is a reduced size diameter portion 52, and formed on one side thereof is a further reduced size diameter portion 54 of inertial mass 50.

Formed in the inner walls of first rod member 40 within chamber 44 is a depression in the shape of a groove 56. Alternately, the depression may include a plurality of individual depressions. The groove 56 is formed in the inner walls of first rod member 40 to serve as a socket for receiving a plurality of ball bearings 58. Each ball bearing 58 is disposed in a radial passageway 59 in second rod 42. While four ball bearings are employed according to one embodiment, any number of ball bearings 58 may be employed. Groove 56 is shaped to substantially conform to the shape and size of spherical ball bearings 58. With push rod 22 in the normal non-collapsed state, the ball bearings 58 are disposed in groove 56 and abut the reduced diameter section 52 of inertial mass 50. Accordingly, section 52 biases the bearings 58 into groove 56, and the positioning of bearings 58 in groove 56 prevents relative movement to maintain a rigid connection between the first and second rod members 40 and 42. This rigid connection prevents the collapse of push rod 22 by preventing telescopic movement of second rod member 42 towards first rod member 40.

The second rod member 42 is cylindrically shaped with an outer diameter to substantially conform to the shape and size of the chamber 44. Second rod member 42 extends partially into chamber 44 and is shaped to fit within the chamber 44 of first rod member 40. Second rod member 42 has a plurality of radial passageways 59 for receiving corresponding ball bearings 58. The connection assembly operates such that push rod 22 is rigid at low axial forces, and is telescopically movable when experiencing higher axial forces once the connector assembly is released. Disposed about the outer surface of second rod member 42 is a deformable tube 60 (e.g., collar) that preferably abuts end 46 of first rod member 40 and extends to an extended diameter stop member 62 formed on the outer surface of second rod member 42. The deformable tube 60 is designed to have longitudinal compression properties such that compression tubing 60 maintains its constant diameter shape during a normal vehicle operation, and is collapsible so as to compress and absorb energy upon experiencing excessive axial force. Examples of suitable materials for the compression tubing 60 include polymeric and metal materials that may be made of various configurations and constructions.

With particular reference to FIG. 3, the brake pressure push rod 22 is shown in a collapsed (i.e., deformed) position during a frontal collision of the vehicle. During a vehicle collision, the inertial mass 50 of the connector assembly is axially movable in response to vehicle deceleration. Upon experiencing an amount of deceleration indicative of a frontal collision, the inertial mass 50 is forced against bias spring 48 so as to compress spring 48 and, at the same time, the inertial mass 50 moves from the first position to a second position. When inertial mass 50 moves to the second position, ball bearings 58 come out of contact with reduced diameter section 52 and are disengaged from groove 56 to disconnect the connector assembly. Once ball bearings 58 are removed from groove 56, the second rod member 42 is able to move axially relative to the first rod member 40 to collapse telescopically upon experiencing a force greater than a predetermined amount of force that is sufficient to compress compression tube 60. Upon experiencing a force greater than the predetermined amount of force, second rod member 42 is moved axially inward within chamber 44 of first rod member 40 and compression tube 60 compresses as shown to absorb energy during the collision event and to reduce the amount of force that is transferred to the pedal 14 and foot pad 16.

Figure 4:
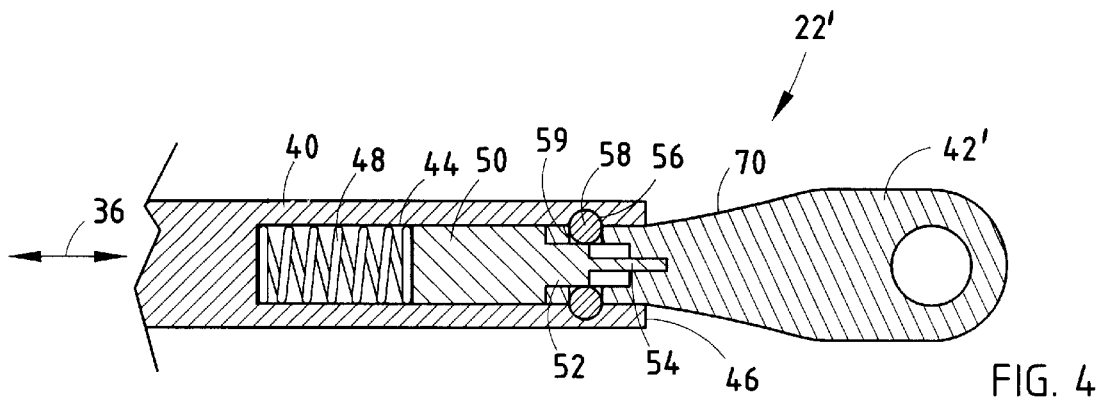
FIG. 4 is a partial enlarged cross-sectional view of a collapsible brake pressure push rod according to a second embodiment of the present invention and shown in a non-collapsed position.
Figure 5:
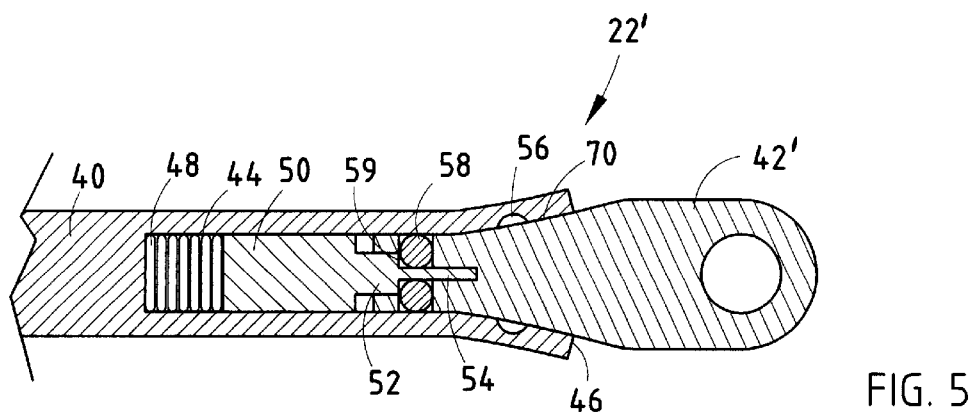
FIG. 5 is a partial enlarged cross-sectional view of the brake pressure push rod of FIG. 4 shown in a collapsed position during a vehicle collision.

In FIGS. 4 and 5, a collapsible brake pressure push rod 22' is shown for use in the pedal assembly 12 according to a second embodiment of the present invention. Referring to FIG. 4, the first rod member 40 of push rod 22' is configured as shown and described in connection with the embodiment of FIGS. 2 and 3. However, the embodiment of push rod 22' employs an alternately configured second rod member 42' that has a tapered outer surface 70, forming a neck, engaging the open end of chamber 44. The second rod member 42' likewise abuts ball bearings 58 during a normal vehicle operation and the connector assembly made up of inertial mass 50, spring 48, and ball bearings 58, prevents axial collapse of the push rod 22' in the normally interconnected position. However, during a vehicle collision, inertial mass 50 moves in response to a sensed deceleration to disengage ball bearings 58 from groove 56 to thereby disconnect the connector assembly. Once ball bearings 58 are removed from groove 56, the second rod member 42 is forcefully actuable into chamber 44 upon experiencing an axial force greater than a predetermined amount of force to telescopically collapse the push rod 22' as shown in FIG. 5. While experiencing the axial force greater than the predetermined force, the tapered surface 70 of second rod member 42' serves as a wedge to deform the open end 46 of chamber 44 and allows the second rod member 42' to be forced axially within chamber 44 in a manner that absorbs energy and reduces the amount of the force transferred to the foot of the operator during a vehicle collision.

Accordingly, the brake pedal assembly of the present invention advantageously absorbs energy and reduces force transfers to the foot of an operator upon imposition of a detected frontal load of the vehicle. While the present invention has been described herein in connection with reducing forces, such as impact forces, transferred through a hydraulic brake pedal assembly during a vehicle collision, it should be appreciated that the present invention may be used with other types of pedal assemblies to minimize adverse affects on the vehicle occupants. For example, the present invention may be used to reduce such forces transferred through a hydraulic clutch assembly pedal.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A pedal assembly for a vehicle, said pedal assembly comprising:

a pedal operatively engageable by a vehicle operator;

a collapsible push rod coupled to the pedal and having a first rod member operatively engaged with a second rod member; and a control mechanism for maintaining said push rod in a non-collapsed state during normal vehicle operation, said control mechanism being released independently of an external force applied to said pedal assembly by a vehicle operator and releasing upon experiencing a predetermined vehicle deceleration to allow the first rod member to move relative to the second rod member to reduce force transferred to the pedal.

2. The pedal assembly as defined in claim 1, wherein said pedal assembly comprises a brake pedal assembly.

3. A pedal assembly for a vehicle, said pedal assembly comprising:

a pedal operatively engageable by a vehicle operator;

a collapsible push rod coupled to the pedal and having a first rod member operatively engaged with a second rod member;

a control mechanism for maintaining said push rod in a non-collapsed state during normal vehicle operation, said control mechanism being released independently of an external force applied to said pedal assembly and releasing upon experiencing a predetermined vehicle deceleration to allow the first rod member to move relative to the second rod member to reduce force transferred to the pedal; and wherein said control mechanism comprises an inertial mass that shifts relative to said first and second rod members in response to deceleration.

4. The pedal assembly as defined in claim 3, wherein said control mechanism further comprises:

a chamber formed in one of said first and second rod members for receiving said inertial mass; and a spring disposed in said chamber and biasing said inertial mass to a first position, wherein said inertial mass is movable to a second position upon experiencing said deceleration.

5. The pedal assembly as defined in claim 4, wherein said control mechanism further comprises one or more bearings, wherein said inertial mass has a surface biasing said one or more bearings into a locked position in said first rod member, and wherein said inertial mass is movable to disengage said bearings and allow said first and second rod members to move relative to one another upon experiencing sufficient axial force.

6. The pedal assembly as defined in claim 1 further comprising a compressible tube disposed on said second rod member, wherein said compressible tube is deformable in response to axial force to absorb energy.

7. The pedal assembly as defined in claim 6, wherein said compressible tube is disposed between said first rod member and a stop member on said second rod member.

8. The pedal assembly as defined in claim 1, wherein said second rod member comprises a tapered surface, wherein said second rod member is telescopically movable within said first rod member upon experiencing a predetermined amount of force.

9. A releasable pedal system for an automotive vehicle, said system comprising:

a pedal assembly including a pedal operatively engageable by a vehicle operator;

an actuator assembly for generating an amount of force responsive to the pedal assembly;

a collapsible push rod connected between said pedal assembly and said actuator assembly, said collapsible push rod including a first rod member and a second rod member which are collapsible in an energy-consuming manner upon experiencing a predetermined amount of axial force; and a control mechanism for preventing relative movement between said first and second rod members during normal vehicle operation, said control mechanism being operable to allow for relative movement between said first and second rod members upon experiencing a predetermined deceleration.

10. The pedal system as defined in claim 9, wherein said pedal assembly comprises a brake pedal assembly.

11. The pedal system as defined in claim 9, wherein said control mechanism comprises an inertial mass that is movable in response to deceleration.

12. The pedal system as defined in claim 11, wherein said control mechanism further comprises:

a chamber formed in one of said first and second rod members for receiving said inertial mass; and a spring disposed in said chamber and biasing said inertial mass to a first position, wherein said inertial mass is movable to a second position upon experiencing said deceleration.

13. The pedal system as defined in claim 12, wherein said control mechanism further comprises one or more bearings, wherein said inertial mass has a surface biasing said one or more bearings into a locked position in said first rod member, and wherein said inertial mass is movable to disengage said bearings and allow said first and second rod members to move relative to one another upon experiencing sufficient axial force.

14. The pedal system as defined in claim 9 further comprising a compressible tube disposed on said second rod member, wherein said compressible tube is deformable in response to axial force to absorb energy.

15. The pedal system as defined in claim 14, wherein said compressible tube is disposed between said first rod member and a stop member on said second rod member.

16. The pedal system as defined in claim 9, wherein said second rod member comprises a tapered surface and is telescopically movable within said first rod member upon experiencing a predetermined amount of force.

17. A brake pedal assembly for an automotive vehicle, said brake pedal assembly comprising:

a brake pedal operatively engageable by a vehicle operator;

a collapsible push rod having a first rod member operatively engaged with a second rod member; and a control mechanism including an inertial mass responsive to deceleration for maintaining said push rod in a non-collapsed state during normal vehicle operation, said control mechanism being deployed upon experiencing a predetermined vehicle deceleration to allow the first rod member to move relative to the second rod member to a collapsed state to reduce force transferred to the pedal during a vehicle collision.

18. The pedal assembly as defined in claim 17, wherein said control mechanism further comprises:

a chamber formed in one of said first and second rod members for receiving said inertial mass;

a spring disposed in said chamber and biasing said inertial mass to a first position, wherein said inertial mass is movable to a second position upon experiencing said deceleration; and one or more locking members, wherein said inertial mass has a surface biasing said one or more locking members into a locked position in said first rod member, and wherein said inertial mass is movable to disengage said one or more locking members and allow said first and second rod members to move relative to one another upon experiencing sufficient axial force.

19. The pedal assembly as defined in claim 17 further comprising a compressible tube disposed on said second rod member, wherein said compressible tube is deformable in response to axial force to absorb energy.

20. The pedal assembly as defined in claim 17, wherein said second rod member comprises a tapered surface and is telescopically movable within said first rod member upon experiencing a predetermined amount of force.

* * * * *